US012654188B2

(12) United States Patent
Whitman et al.

(10) Patent No.: US 12,654,188 B2
(45) Date of Patent: Jun. 16, 2026

(54) DISPENSING DEVICE

(71) Applicant: EXPONENT BEAUTY, INC., San Francisco, CA (US)

(72) Inventors: Elizabeth Robinson Whitman, San Francisco, CA (US); Ralph James DeVito, Oxford, CT (US); Pepin Sebastian Gelardi, Brooklyn, NY (US)

(73) Assignee: EXPONENT BEAUTY, INC., San Francisco, CA (US)

(*) Notice: Subject to any disclaimer, the term of this patent is extended or adjusted under 35 U.S.C. 154(b) by 107 days.

(21) Appl. No.: 18/478,008

(22) Filed: Sep. 29, 2023

(65) Prior Publication Data

US 2025/0108394 A1 Apr. 3, 2025

(51) Int. Cl.
*B05B 11/10* (2023.01)
*A47G 19/34* (2006.01)
*B05B 11/00* (2023.01)
*B65D 83/06* (2006.01)

(52) U.S. Cl.
CPC ...... *B05B 11/1047* (2023.01); *B05B 11/0008* (2013.01); *B05B 11/1074* (2023.01); *A47G 19/34* (2013.01); *B65D 83/06* (2013.01)

(58) Field of Classification Search
CPC ............. B05B 11/1047; B05B 11/1074; B05B 11/0008; B65D 83/06; A47G 19/34
USPC ............................ 222/32, 160, 166; 401/264
See application file for complete search history.

(56) References Cited

U.S. PATENT DOCUMENTS

| | | | | |
|---|---|---|---|---|
| 2,706,580 | A * | 4/1955 | Keith | A45D 33/02 222/246 |
| 3,823,853 | A | 7/1974 | Alden | |
| 5,259,537 | A | 11/1993 | Beers | |
| 2016/0109273 | A1 | 4/2016 | Lafosse | |
| 2018/0326166 | A1 | 11/2018 | Schuckmann | |
| 2022/0110467 | A1 * | 4/2022 | Morello | G01F 11/24 |
| 2023/0130943 | A1 | 4/2023 | Gisin | |

OTHER PUBLICATIONS

International Search Report and Written Opinion dated Feb. 25, 2025 which was issued in connection with PCT/US2024/049243.

* cited by examiner

*Primary Examiner* — David J Walczak
(74) *Attorney, Agent, or Firm* — Buckley, Maschoff & Talwalkar LLC

(57) ABSTRACT

A dispensing device and method for operation are provided to dispense a predetermined quantity of a powder from a bottle onto a surface.

7 Claims, 8 Drawing Sheets

DISPENSING DEVICE

TECHNICAL FIELD

Some embodiments are directed to a dispensing device and method that allows the accurate dispensing of a powder or other compound for use on demand.

BACKGROUND

Many formulations, such as those used in the skincare and beauty fields, require the use of active ingredients that become unstable or degrade over time when exposed to oxygen and ultraviolet light. Many skincare providers claim to have stabilized their ingredients. Unfortunately, research by the Applicants has shown that the average clinical skincare jar of moisturizer or serum can lose up to half of its concentration in a mere eight weeks of use. Many skincare providers attempt to maximize the shelf life and safety of a formula rather than the stability and efficacy of the key active and beneficial ingredients.

SUMMARY

According to some embodiments, a dispenser is provided which includes an insert, positioned to cover a mouth of a bottle, the insert holding a doser that is movable from a stop position and an open position. The dispenser includes an actuator, positioned proximate a top of the insert, the actuator movable from a first position and a second position and connected to the doser such that when the actuator is in the first position, the doser is in the stop position and when the actuator is in the second position the doser is in the open position and allows a predetermined quantity of the powder to be dispensed through an actuator opening.

Embodiments allow in the moment precision dispensing of a predetermined quantity of a powder for usage of mixing of ingredients while their efficacy is high and undegraded by oxygen or ultraviolet light. Embodiments allow accurate dosing of a powder for mixing with a liquid on demand.

DETAILED DESCRIPTION

Figure 1:
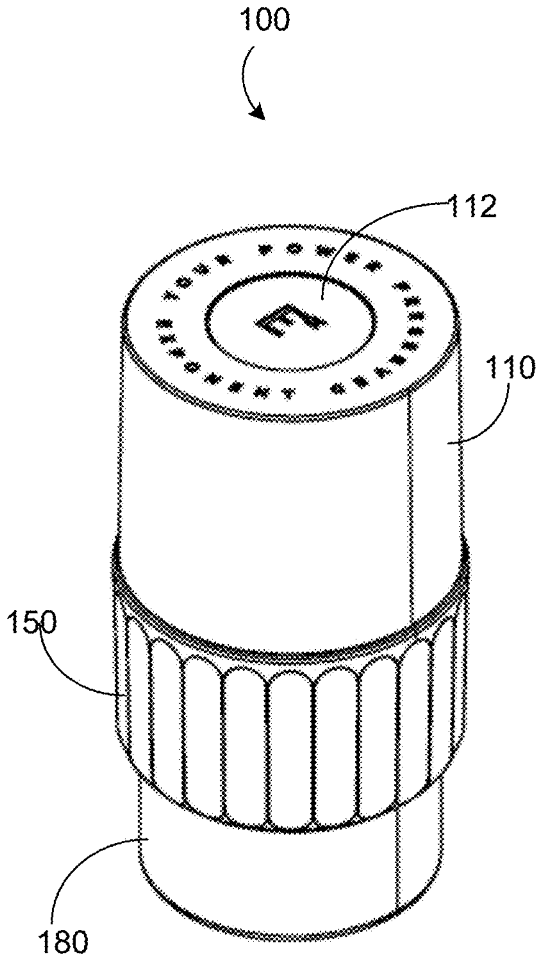
FIG. 1 is a side perspective view of a dispensing device pursuant to some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention relates to a new and useful dispensing device or apparatus and method for use which will be described by first referring to FIGS. 1 and 2 which illustrates various components of a dispensing device 100 pursuant to some embodiments. In the embodiment depicted in FIG. 1, the dispensing device 100 is shown in a configuration where a cap 110 is positioned above a shroud 150 and a bottle 180. Cap 110 is removable when the dispenser 100 is operated (as will be shown below in conjunction with FIGS. 18 and 19). In the embodiment depicted in FIG. 1, cap 110 may have a logo or other messaging embossed or printed on a top of the cap 110 and a cap badge 112 may be positioned with a logo in the center of the top of the cap 110. In some embodiments, cap 110 may be provided without a cap badge 112 and/or other messaging.

Shroud 150, pursuant to some embodiments, may be formed with ridges or other surface markings to facilitate use by a user as will be described herein. A volume of powder may be contained within bottle 180. Bottle 180 may be removed from dispensing device 100 for refilling or replacement of the powder held therein. While the illustrative embodiment of a dispensing apparatus 100 is shown as having a specific shape, those skilled in the art will appreciate that a number of different shapes and ornamental configurations may be used.

Figure 2:
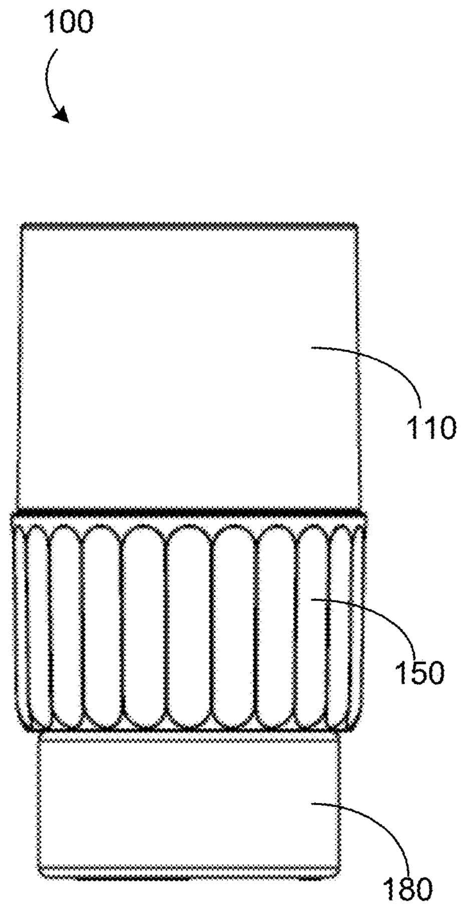
FIG. 2 is a side view of a dispensing device pursuant to some embodiments.

When cap 110 is mounted on dispensing device 100 as shown in FIGS. 1 and 2, the powder is kept dry and contained within bottle 180. In use, a user may remove cap 110 and operate dispensing device 100 to dispense a predetermined quantity or volume of powder as will be described further herein. Dispensing device 100 is configured to be portable, easy to use and maintain, and reliable in operation with few moving parts while still enabling a user to accurately dispense a known quantity or volume of powder. In some embodiments, the powder dispensed from dispensing device may be, for example, a compound used for personal care (such as cosmetics, skin cream or the like), pharmaceutical products, food products, decorative products or other compounds to be created when needed, and may be mixed with a liquid (e.g., such as an activator that activates beneficial properties of the powder so that a cream or tincture is formed that may be applied, e.g., to a user's skin) to provide an efficacious mixture for use on demand and as needed. The powder may be a number of different compounds such as, for example, dried vitamin C, Retinol, CoQ10, Resveratrol, Willow Bark extract, or the like. Pursuant to some embodiments, dispensing device 100 protects the powder from air, ultraviolet light, water and other particles that could contaminate the ingredients of the powder and/or cause degradation of the efficacy of the ingredients.

Each of the components of dispensing device 100 may be made from plastic or other durable and non-toxic materials. The components together function to allow a user to dispense a predetermined volume or quantity of a powder on demand, allowing, for example, personal care products (such as cosmetics, skin cream or the like), pharmaceutical products, food products, decorative products or other compounds to be created when needed. The bottle 180, shroud 150 and cap 110 (and other components described herein) function to protect the powder from air, ultraviolet light, water and other particles that could contaminate the ingredients and/or cause degradation of the efficacy of the ingredients.

The dispensing device 100 may be formed or manufactured in a shape which facilitates ease of use by a user. For example, as shown in FIGS. 1 and 2, dispensing device 100 may be generally cylindrical in shape making it easy for a user to hold and operate. Those skilled in the art, upon reading the present disclosure, will appreciate that other shapes and configurations may be used.

Figure 18:
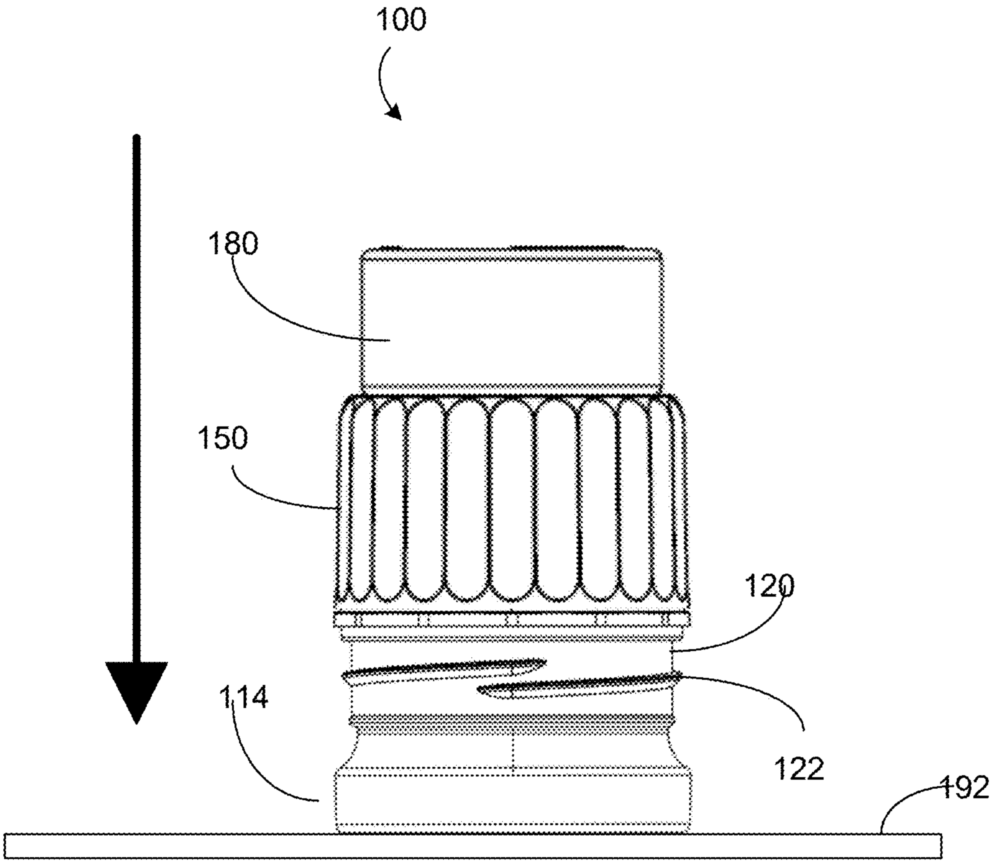
FIG. 18 is a side view of a dispensing device pursuant to some embodiments.
Figure 19:
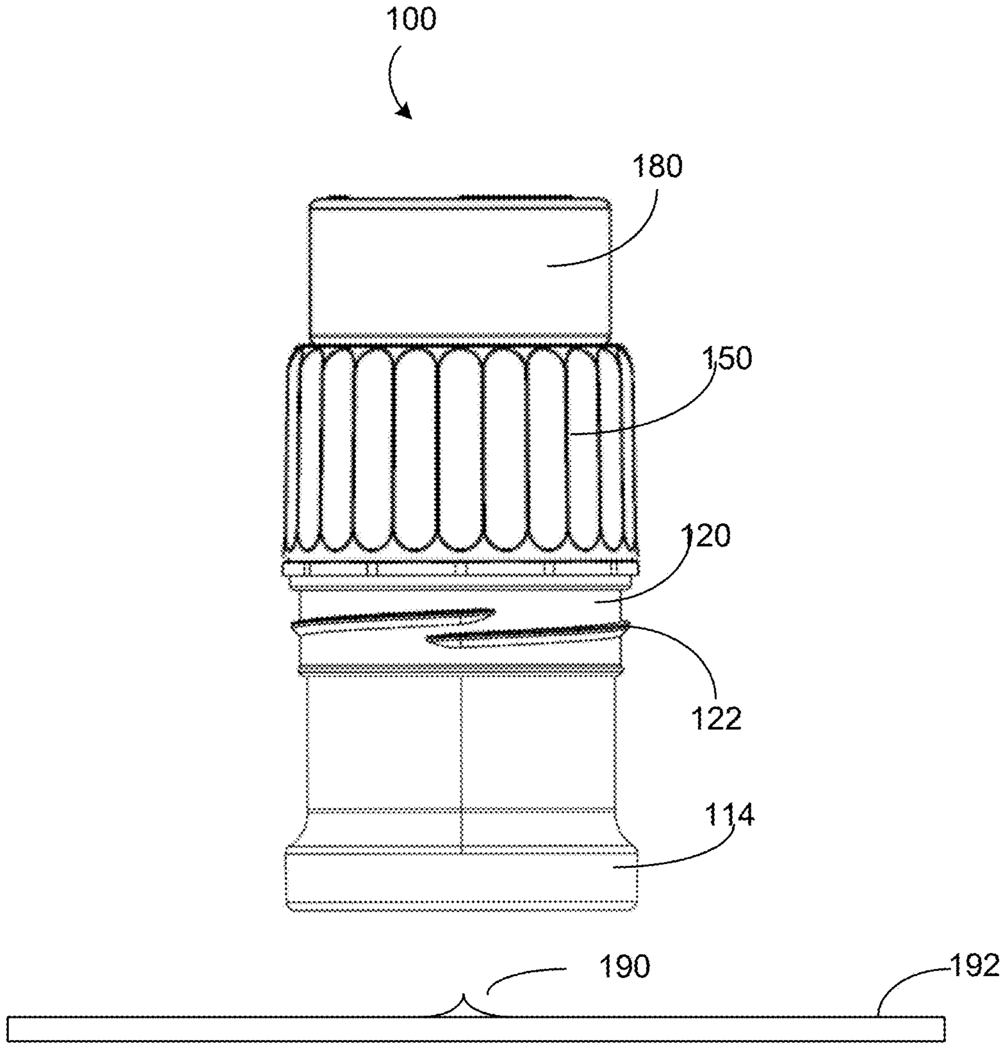
FIG. 19 is a side view of a dispensing device pursuant to some embodiments.

Reference is now made to FIGS. 18 and 19. To operate dispensing device 100, cap 110 (shown in FIG. 1) is removed from dispensing device 100. Removal of cap 110 reveals an actuator 114. Dispensing device 100 is positioned so that actuator 114 is proximate to a surface 192 (such as, for example, a user's hand or other surface onto which powder will be dispensed). The user pushes down on dispensing device 100 as shown in FIG. 18. This causes actuator 114 to recede into a collar 120 (and interact with components that will be described further herein) to cause a predetermined quantity of powder to be dropped from the bottle 180 onto surface 192. As shown in FIG. 19, dispensing device 100 may be lifted from surface 192 to reveal the dispensed powder 190. As further shown in FIG. 19, in some embodiments, actuator 114 automatically extends back into its original position (extending from collar 120). For example, pursuant to some embodiments, actuator 114 extends back into its original position by action of spring 124. Pursuant to some embodiments, the quantity of the powder 190 dispensed is reliably consistent, ensuring a desired dosage or quantity is dispensed. The user may then place cap 110 back on dispensing device 100 for storage until the device is used again.

Pursuant to some embodiments, the dispensed powder 190 may then be mixed with a quantity of a liquid (such as an activator) to activate beneficial properties of the powder 190. The user may then mix the liquid with the powder using a finger or other object. The mixing activates the ingredients in the powder, thereby ensuring maximum efficacy immediately before the mixture is applied, e.g., to a user's skin. For example, pursuant to some embodiments, the powder may be an active ingredient such as an antioxidant and the liquid may be a compound or composition that serves to activate the active ingredients in the powder.

Pursuant to some embodiments, the ability to dispense a predetermined quantity of a powder for mixing as needed maximizes the efficacy of the active ingredients in the powder. Embodiments allow users to create "freshly-made" and highly concentrated mixtures that keep the active ingredients at their most stable and optimal form until combined on a per-use basis. Instead of maximizing shelf life with stabilizers, emulsifiers and other ingredients that primarily benefit formula stability, the topical composition of one or more embodiments is focused on fresh formulas that primarily benefit the skin and deliver positive performance. Those skilled in the art, upon reading the present disclosure, will appreciate that embodiments may be used to dispense predetermined quantities of powder or other dry material for other uses as well.

The result is a dispensing device and method that are reusable, that may be used with a quantity of powder before a refill is required, and that allows a desired quantity of powder without requiring measurement by the user. Further, embodiments allow a user to selectively dispense (and activate) the powder as needed, thereby preserving the efficacy of the compounds. The dispensing device ensures that the powder is stored without undue exposure to harmful elements (such as the sun or light) that may degrade the efficacy of the powder. Embodiments allow the dispenser to easily be transported, stored, cleaned and maintained. Other features and advantages will become apparent to those skilled in the art upon reading the following disclosure.

Figure 3:
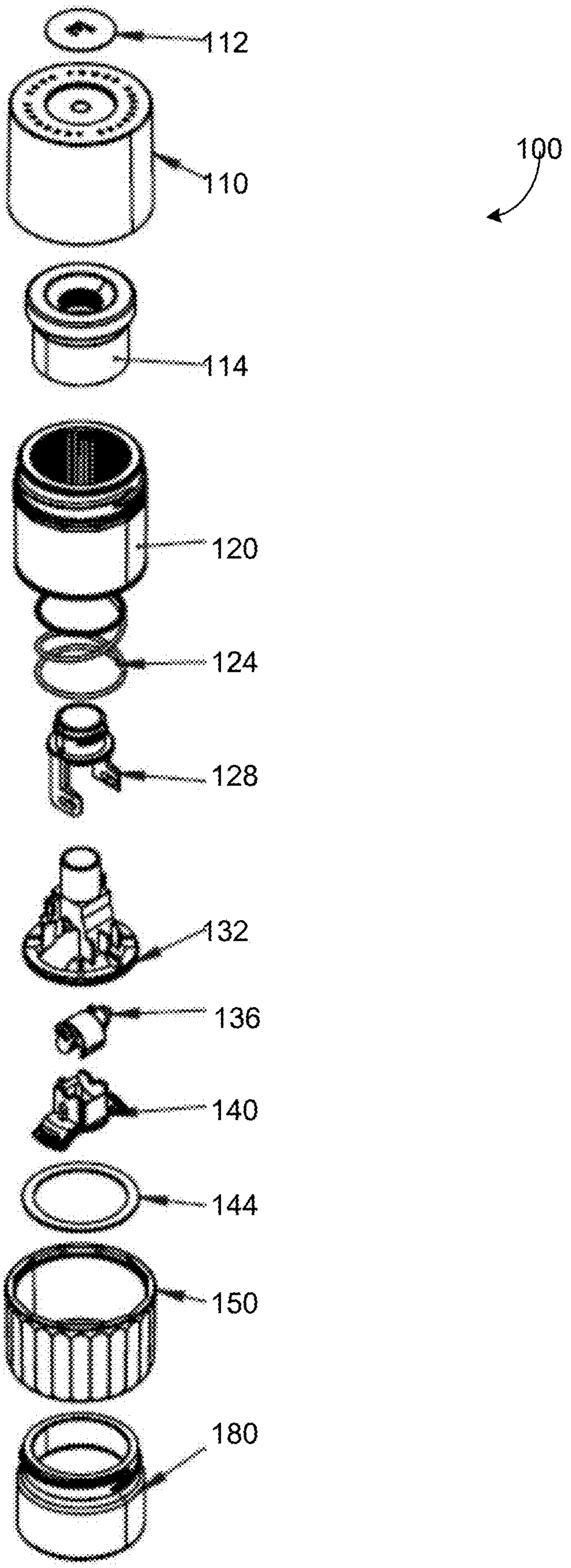
FIG. 3 is an exploded perspective view of a dispensing device pursuant to some embodiments.
Figure 4:
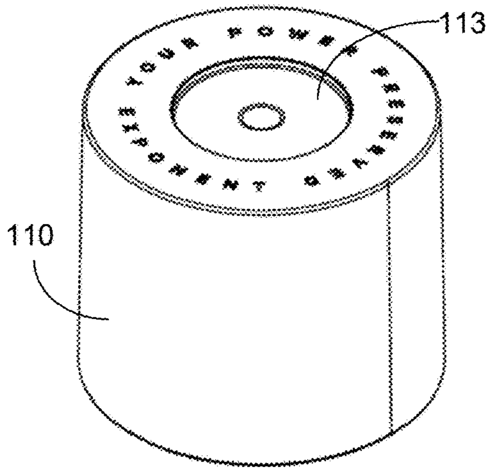
FIG. 4 is a perspective view of a cap of a dispensing device pursuant to some embodiments.
Figure 5:
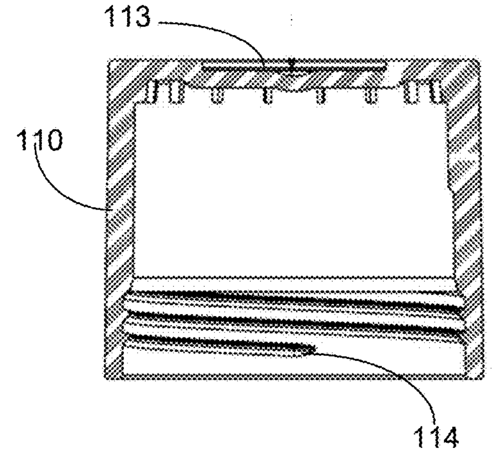
FIG. 5 is a side cross sectional view of the cap of FIG. 4 pursuant to some embodiments.
Figure 6:
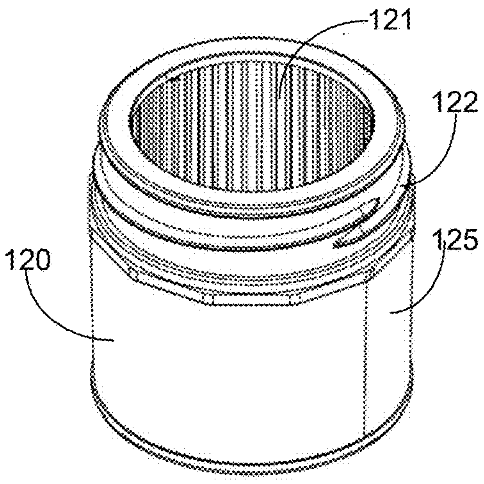
FIG. 6 is a perspective view of a collar of a dispensing device pursuant to some embodiments.
Figure 7:
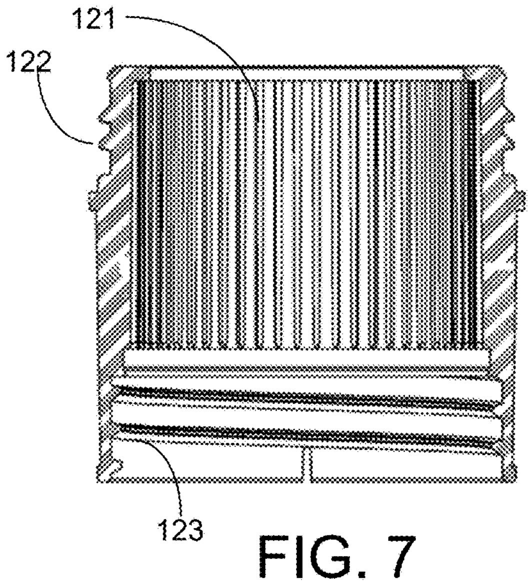
FIG. 7 is a side cross sectional view of the collar of FIG. 6 pursuant to some embodiments.
Figure 8:
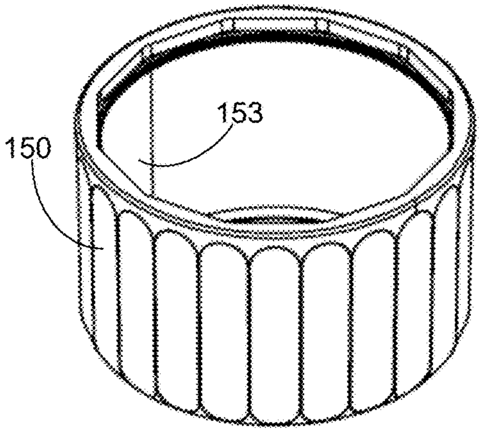
FIG. 8 is a perspective view of a shroud of a dispensing device pursuant to some embodiments.
Figure 9:
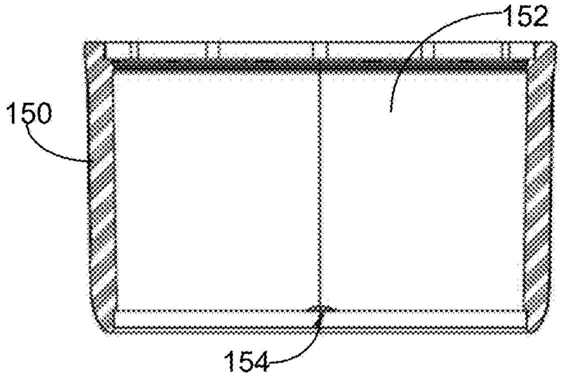
FIG. 9 is a side cross sectional view of the shroud of FIG. 8 pursuant to some embodiments.

Reference is now made to FIG. 3 where an exploded view of the components of a dispensing device 100 pursuant to some embodiments are shown. The exploded view shows how each of the components 112-180 are arranged in dispensing device 100. At one end of the dispensing device 100 is a cap 110 with an optional cap badge 112 that fits within a badge recess 113 (shown in FIG. 4) on a top surface of cap 110. The cap 110 is sized to fit around an actuator 114 when cap 110 is placed on the dispensing device 100. As shown in FIG. 5, cap 110 has interior threads 114 which are formed to mate with corresponding threads on collar 120 (shown as collar threads 122 of FIG. 6). The interior 121 of collar 120 extends through collar 120 allowing other components (such as an optional spring 124, a linkage 128, an insert 132, a doser 136, an insert cover 140 and a gasket 144 to fit therein and for powder to pass from the bottle 180 through the actuator 114 in use). Collar 120 has collar interior threads 123 that are formed to mate with corresponding threads on bottle 180. A shroud 150 is sized and formed to fit around the exterior of the collar 120. The exterior of collar 120 has one or more flat surfaces 125 (FIG. 6) which fit against corresponding flat surfaces of shroud 150 (shown as item 153 of FIG. 8). This ensures that shroud 150 does not rotate with respect to collar 120 in use.

When collar 120 is placed within shroud 150 and bottle 180 is screwed onto the threads 123 of collar 120, shroud 150 is seated firmly on a top of the bottle 180 and sealed against the top of the bottle 180 using a gasket 144 forming an enclosed and protective container for the bottle 180 and its contents. A bottom of shroud 150 is open, allowing the powder from bottle 180 to come into contact with doser 136. When doser 136 is operated (as will be described further below), a predetermined volume of powder is dispensed through actuator 114.

Figure 10:
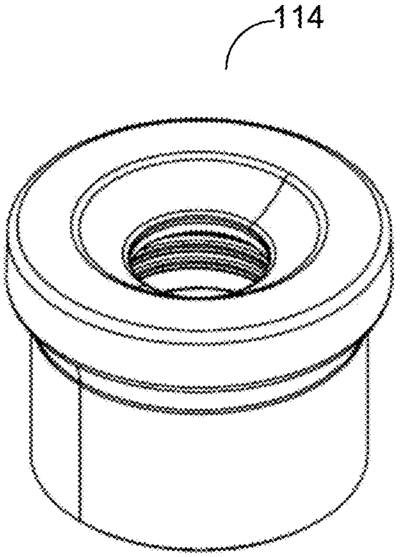
FIG. 10 is a perspective view of an actuator of a dispensing device pursuant to some embodiments.
Figure 11:
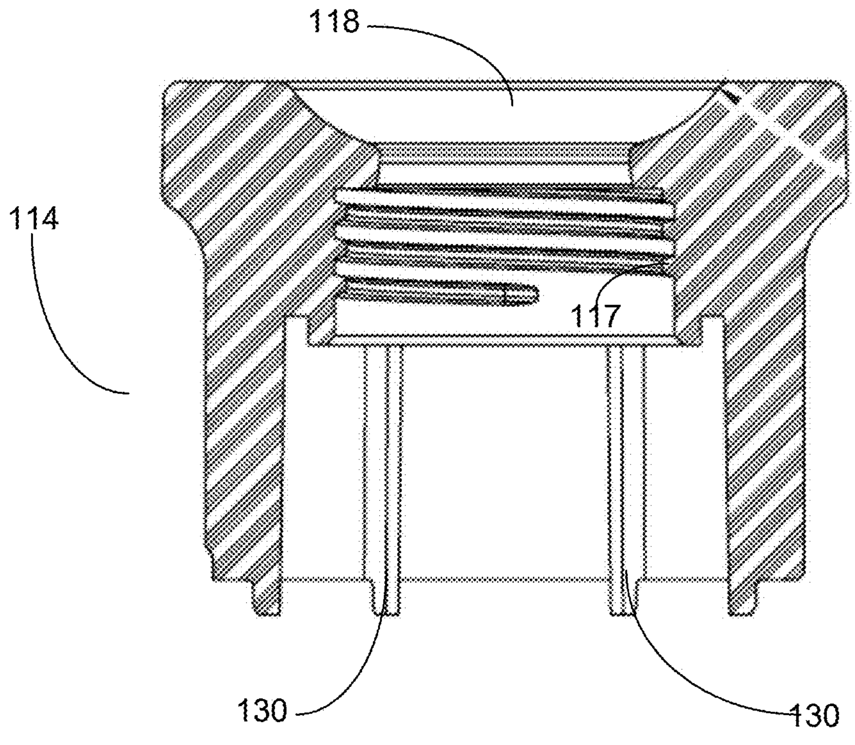
FIG. 11 is a side cross sectional view of the actuator of FIG. 10 pursuant to some embodiments.
Figure 12:
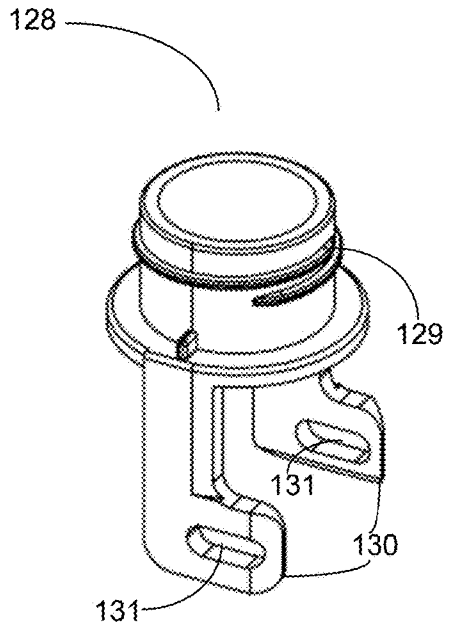
FIG. 12 is a perspective view of a linkage of a dispensing device pursuant to some embodiments.
Figure 13:
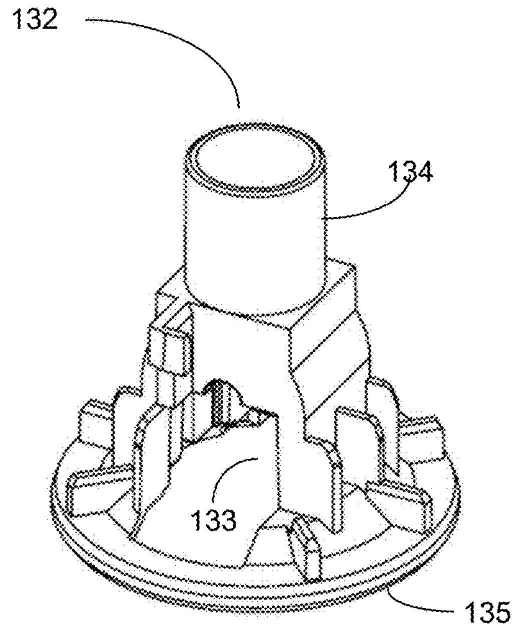
FIG. 13 is a perspective view of an insert of a dispensing device pursuant to some embodiments.
Figure 14:
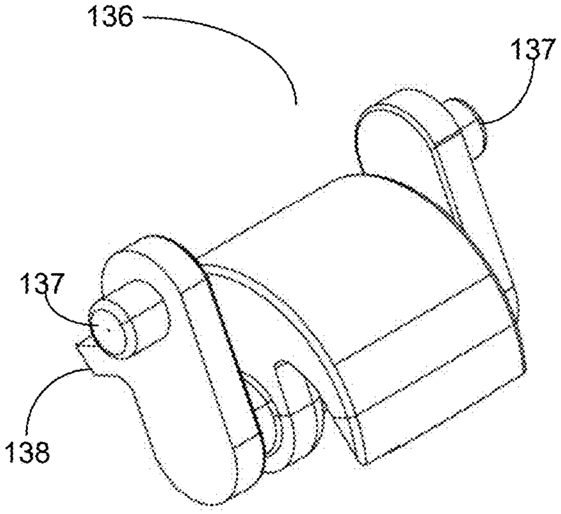
FIG. 14 is a perspective view of a doser of a dispensing device pursuant to some embodiments.
Figure 16:
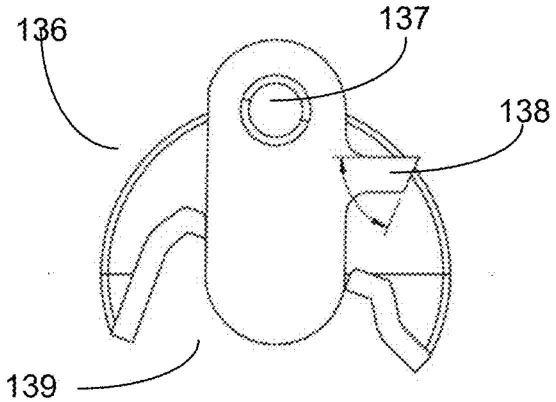
FIG. 16 is a side view of a doser of a dispensing device pursuant to some embodiments.
Figure 17:
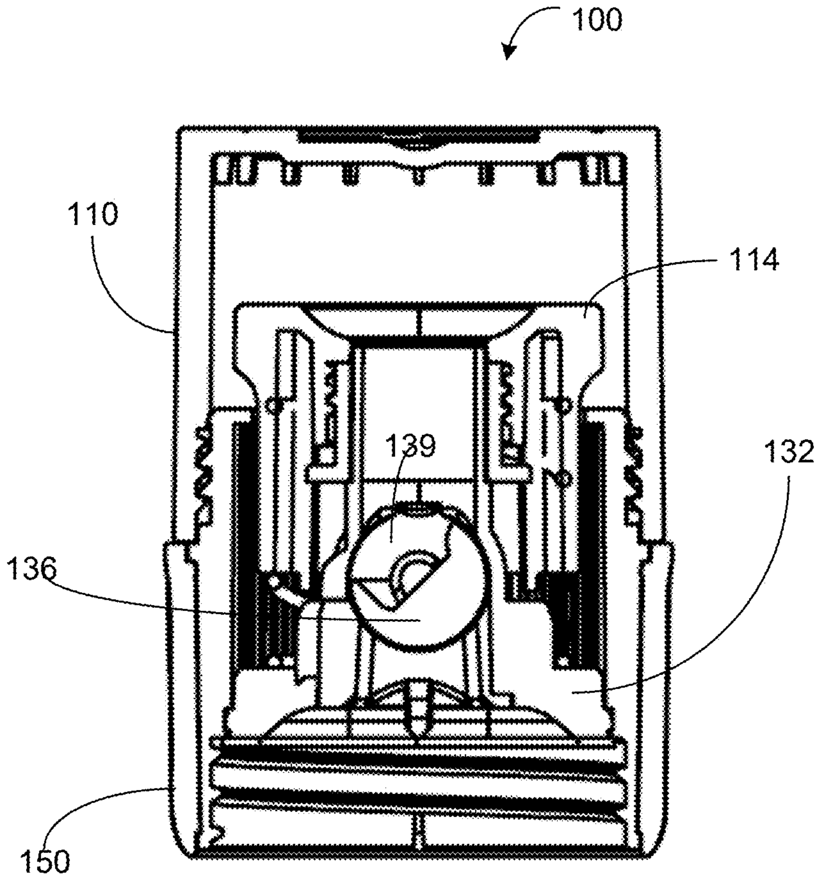
FIG. 17 is a cross-sectional view of a portion of a dispensing device pursuant to some embodiments.

Features of actuator 114 may be seen in FIGS. 10-11. Actuator 114 has a central cavity 118 that extends from the top to the bottom allowing a path for powder to be dispensed during operation. An interior of actuator 114 is formed with actuator threads 117 which mate with corresponding threads 129 of a linkage 128 (shown in FIG. 12). Two linkage legs 130 extend downwardly from central cavity 118 of actuator 114. As discussed in conjunction with FIGS. 18 and 19, in use, actuator 114 is depressed which causes linkage legs 130 to extend further downwardly. Linkage legs 130 each have a recess 131 that is formed to mate with protrusions 137 of a doser 136 (shown in FIG. 14). Doser 136 fits within a recess 133 of an insert 132 (shown in FIG. 13). Insert 132 has an upper portion 134 that is cylindrical in shape and that is formed to fit within a recess of linkage 128. As actuator 114 is pushed (which, in some embodiments, causes spring 124 to bias), linkage legs 130 move the doser 136 from a first position (in which a dose holder 139 shown in FIGS. 16 and 17 is facing the mouth of bottle 180 allowing a predetermined amount of powder 190 to collect in the dose holder 139) to a second position (in which doser 136 is rotated about protrusions 137 so that the dose holder 139 is facing toward the actuator 114). When doser 136 is moved to the second position (where the dose holder 139 faces the actuator 114), a predetermined amount of powder 190 is dispensed from the dispenser 100 through the actuator opening 118. In some embodiments where spring 124 is used, release of the actuator 114 causes spring 124 to push the actuator 114 back into its starting position and doser 136 is rotated back to the first position (in which dose holder 139 again faces the mouth of bottle 180).

Figure 15:
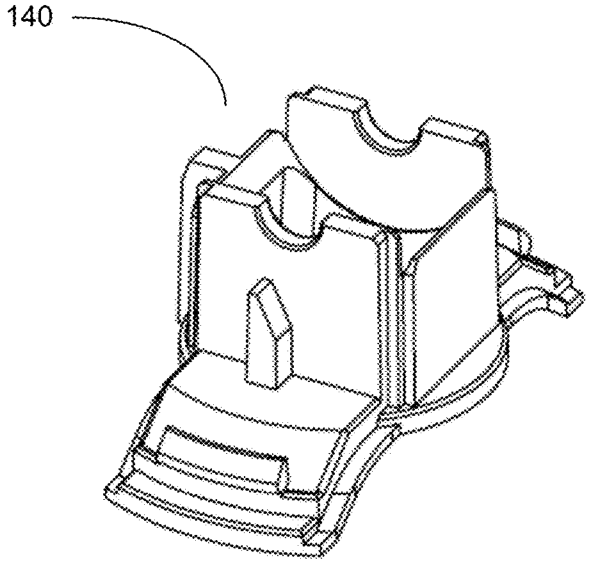
FIG. 15 is a perspective view of an insert cover of a dispensing device pursuant to some embodiments.

Features of doser 136 may be seen in FIG. 16 where a side view of doser 136 is shown. Dose holder 139 is sized such that it may hold a predetermined amount of powder. The rotation of doser 136 between a first position and a second position is limited by a stop 138 that is formed with an angled end having an angle selected to limit the range of movement of doser 136. In some embodiments, the angle is selected to be approximately 60-70° (sufficient to ensure that in a first position, dose holder 139 is positioned to receive powder 190 from bottle 180, and in a second position, dose holder 139 is positioned to dispense the powder 190). Referring to FIG. 17, a partial cross-section of dispenser 100 is shown in which doser 136 is in the second position (the position in which powder 190 may be dispensed through an opening formed by the actuator 114 and the linkage 128). Doser 136 is rotatably held within recess 133 of insert 132 by an insert cover 140 (shown in FIG. 15). Insert 132 has a circular base 135 that is sized to fit the top edge of the bottle 180 and may be sealed using a gasket 144 that fits between the top edge of bottle 180 and the bottom of insert 132.

In typical usage, the dispenser 100 is held upside down (so the actuator 114 faces a surface 192 as shown in FIG. 18), a predetermined amount powder 190 drops from the bottle 180 into the dose holder 139 when the doser 136 is in the first position. When dispenser 100 is pushed downward (in the direction of the arrow) against the surface 192, actuator 114 biases spring 124 and causes doser 136 to rotate from the first position to the second position (in which dose holder 139 is moved to the second position facing the surface 192). This action causes dispenser 100 to dispense a predetermined amount of powder 190 onto surface 192. The doser 136 is formed to only allow a predetermined amount of powder 190 to be released as a stop 138 prevents the doser 136 from moving too far. When dispenser 100 is removed from surface 192, spring 124 causes actuator 114 to extend and further causes doser 136 to return to the first position (in which dose holder 139 faces bottle 180). When in the second position, the dose holder 139 and doser 136 prevent powder 190 from being dispensed or otherwise exiting the actuator opening 118. For clarity, the first position may be referred to herein as a "stop position" (in which powder 190 is prevented from being dispensed) and the second position may be referred to herein as an "open position" (in which a predetermined amount of powder 190 is allowed to be dispensed).

The result is a secure, easy to clean, reliable dispenser of a predetermined volume of powder 190. The interior of dispenser 100 provides a sealed environment to ensure that the efficacy of the powder 190 is not degraded during storage, so that when dispensed, the beneficial properties of the powder 190 may be activated for use and application by a user on demand. The movement of parts of dispenser 100 are minimized to ensure long life through repeated uses.

With the above description of components of some embodiments of the present invention, a brief description of the operation of a mixing assembly pursuant to the present invention will now be provided. Those skilled in the art, upon reading this disclosure, will appreciate that different configurations of components may be used to achieve the following operation and that the components described above are an illustrative example of specific embodiments.

While embodiments have been described herein by reference to skin care and beauty applications, those skilled in the art, upon reading the present disclosure, will appreciate that other formulations would benefit from the dispensing features of the present invention.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims. For example, while an embodiment has been described in a spring 124 is provided to bias the actuator 114 back into a ready position, in some embodiments, no spring may be required and a user may simply pull the actuator 114 back into a ready position after dispensing a dose of powder. Further, while the use of a "bottle" is described, those skilled in the art, upon reading this disclosure, will appreciate that the bottle may be other types of containers used to hold compounds therein. The container may be formed of glass (such as a bottle) or other types of material.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A dispenser, comprising:

a bottle for holding a volume of powder;

an insert, positioned to cover a mouth of the bottle, the insert holding a doser that is movable from a stop position and an open position; and an actuator, positioned proximate a top of the insert, the actuator movable from a first position and a second position, the actuator having a first linkage leg having a first recess and a second linkage leg having a second recess, the first and second recess formed to rotatably receive a portion of the doser such that when the actuator is in the first position, the doser is in the stop position and when the actuator is in the second position the doser is in the open position and allows a predetermined quantity of the powder to be dispensed through an actuator opening.

2. The dispenser of claim 1, wherein the bottle has an open top portion having a set of bottle threads, the dispenser further comprising:

a collar, shaped as a cylinder and having an interior space, an open collar bottom and an open collar top, the open collar bottom containing interior threads mating with the bottle threads, the collar enclosing the insert and a portion of the actuator in the interior space.

3. The dispenser of claim 2, wherein the open top of the collar has exterior threads, the dispenser further comprising:

a cap, shaped as a cylinder and having an open cap bottom and a closed cap top, the open cap bottom containing interior threads mating with the exterior threads of the collar.

4. The dispenser of claim 2, further comprising:

a shroud, shaped as a cylinder and having an interior space, an open shroud bottom and an open shroud top, the open shroud bottom formed to fit on a top of the bottle, the open shroud top formed to receive the collar and to be held securely against the bottle when the interior threads of the collar are engaged with the bottle threads.

5. The dispenser of claim 2, further comprising:

a spring positioned between the insert and a bottom of the actuator, the spring biasing the actuator in the first position.

6. The dispenser of claim 2, further comprising:

a gasket, the gasket positioned between the insert and a top of the bottle.

7. A method for operating a dispensing device to dispense a predetermined quantity of a powder from a bottle, the method comprising:

removing a cap from a top of the dispensing device;

positioning the dispensing device so the top of the dispensing device is proximate a surface; and pushing the dispensing device downward onto the surface to cause an actuator to move from a first position to a second position, the actuator having a first leg having a first recess and a second leg having a second recess, the first and second recess formed to rotatably receive a portion of a doser, wherein movement of the actuator from the first position to the second position causes the doser to move from a stop position in which none of the powder is dispensed to an open position in which the predetermined quantity of the powder is permitted to drop from the bottle through the doser onto the surface.

* * * * *